Oct. 4, 1932.  E. C. NOBLE  1,880,356

COUPLING

Filed March 2, 1931

Edward C. Noble  INVENTOR.

BY *J. Vincent Martin*

ATTORNEY.

Patented Oct. 4, 1932

1,880,356

UNITED STATES PATENT OFFICE

EDWARD C. NOBLE, OF HOUSTON, TEXAS

COUPLING

Application filed March 2, 1931. Serial No. 519,367.

This invention relates generally to couplings, and specifically to that type embodying a sleeve and a plurality of wedges movable therein to grip and hold a cable or the like.

It has for some of its objects the provision of new and improved means to connect the wedges together so that they may be handled as a unit; to guide the wedges from their inactive positions into their active positions to effect an efficient gripping of the cable; and to releasably lock the wedges in their active positions to prevent inadvertent release of the cable.

Other objects will hereinafter appear.

Figure 1:
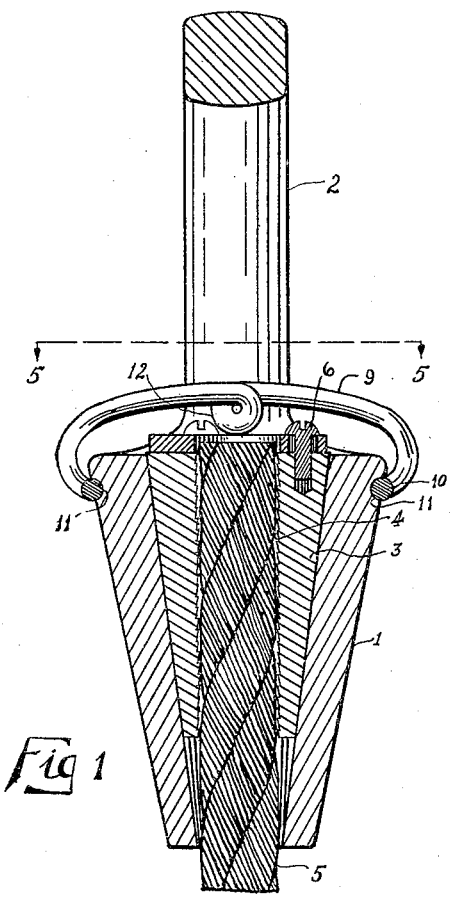
Figure 2:
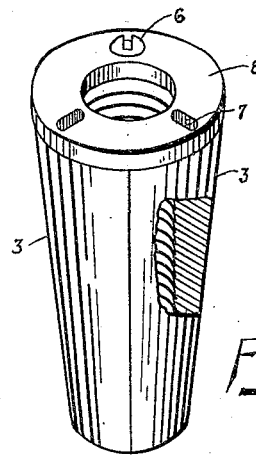
Figure 3:
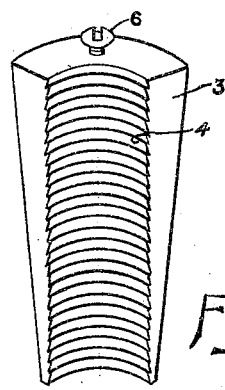
Figure 5:
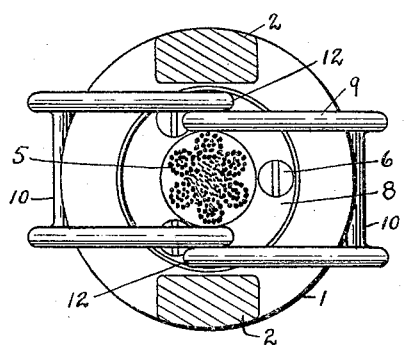
Figure 4:
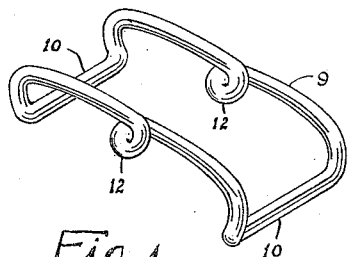

The preferred embodiment of the invention is illustrated by the accompanying drawing. Fig. 1 is a sectional elevation of the coupling applied to a cable; Fig. 2, a partly sectional perspective view of the wedges and ring; Fig. 3, a view of one of the wedges; Fig. 4, a view of the wedge locking device; and Fig. 5, a horizontal section on the line 5—5 of Fig. 1.

The sleeve 1 of the coupling is internally tapered and has a handle or bail 2 whereby it may be connected to any object.

The arcuate gripping wedges 3 are externally tapered to fit rotatably within the sleeve 1, and are internally serrated, as indicated at 4, to grip the cable 5. There are preferably three or more wedges, and each has a pin 6 slidable in one of the radial slots 7 of the connecting and guiding ring 8. As shown, the pins 6 are set screws screwed into the wedges 3, extending through the slots 7, and having heads to engage the ring 8 to prevent separation thereof.

The resilient locking device is shown at 9 and has inwardly bent end portions 10 to be forced into the external groove 11 of the sleeve 1, and intermediate coiled portions 12 to bear against diametrically opposite sides of the ring 8.

The use of the coupling and its advantages may be stated briefly as follows:

The user may first place the wedges 3, held together by the ring 8, into the sleeve 1. The cable 5 may then be inserted in that end of the sleeve 5 remote from the bail 2, between the wedges 3, and through the ring 8. The sleeve 1 may then be jerked in one direction and the cable 5 in the other, whereupon the wedges will be moved into the smaller portion of the sleeve and into gripping and holding engagement with the cable. The ends 10 of the locking device 9 may then be forced into the grooves 11 to hold the wedges in their active gripping positions.

The wedges cannot move longitudinally with respect to each other because such movement is prevented by the guiding ring 8. Therefore, when the sleeve is jerked in one direction and the cable in the other, the wedges move longitudinally together into the sleeve, and radially toward each other into gripping engagement with the cable. The longitudinal and radial movement of each of the wedges being the same as that of the others, the cable is securely held.

When it is desired to release the cable, the locking device 9 is removed, and the sleeve 1 may then be held stationary and the cable 5 forced thereinto toward the bail 2. The cable will move the wedges 3 out of the smaller portion of the sleeve to permit them to move radially apart. The wedges may then be held to prevent their return to the smaller portion of the sleeve, and the cable readily withdrawn.

The advantages of a coupling constructed as herein disclosed will be apparent to those skilled in the art.

I claim:

A coupling having an internally tapered sleeve; a plurality of internally serrated, externally tapered, and arcuate gripping wedges movable longitudinally and rotatable in said sleeve, each of said wedges having a pin; a connecting and guiding ring having radial slots in which said pins are slidable; and a removable resilient device engaging said sleeve and ring to hold said wedges in their active positions.

In testimony whereof, I hereunto affix my signature.

EDWARD C. NOBLE.